United States Patent [19]
Thomas

[11] 4,436,456
[45] Mar. 13, 1984

[54] PNEUMATIC COMMUNICATION SYSTEM FOR BANKING AND THE LIKE
[75] Inventor: William D. Thomas, Marion, Iowa
[73] Assignee: Kidde, Inc., Clifton, N.J.
[21] Appl. No.: 306,289
[22] Filed: Sep. 28, 1981
[51] Int. Cl.³ .................... B65G 51/08; B65G 51/26
[52] U.S. Cl. .................................. 406/19; 406/73; 406/112
[58] Field of Search ................ 406/73, 76, 10, 13, 406/19, 21, 28, 31, 111, 112

[56] References Cited
U.S. PATENT DOCUMENTS
3,419,229 12/1968 Crosby .
3,512,735 5/1970 Hallstrom .
3,556,437 1/1971 Svedman ..................... 406/76 X
3,761,039 9/1973 Hazell .......................... 406/111
4,084,769 4/1978 Tyler ............................ 406/106

Primary Examiner—John J. Love
Assistant Examiner—Paul A. Sobel
Attorney, Agent, or Firm—Simmons, Perrine, Albright & Ellwood

[57] ABSTRACT

A pneumatic system for banking consists of a pair of upright customer and teller terminals joined at right angles at their lower ends by a carrier transit tube. Each terminal includes a carrier elevator, a blower and a special ducting such that while only one blower propels the carrier from the sending to the receiving terminal both blowers are used to raise the elevator and carrier at the receiving terminal. Air valves at each terminal influence the movement of the carrier, and various controls initiate the sequence of operations by which the carrier is transferred between the terminals.

9 Claims, 7 Drawing Figures

PNEUMATIC COMMUNICATION SYSTEM FOR BANKING AND THE LIKE

BACKGROUND OF THE INVENTION

Pneumatic systems are now widely used for out-of-doors or so-called "drive-up" banking in which tellers at indoors teller terminals attend to customers who motor up to out-of-doors customer terminals to do their banking. Typically, these systems employ carriers to transfer money and papers back and forth between the teller and customer terminals, which carriers are driven or drawn by pneumatic pressure through transit tubes interconnecting the terminals. Characteristic of these systems are the large radiused bends in the transit tubes, necessary in order to bring the tubes into the terminals (or otherwise to change their direction) and at the same time to allow the bends to be negotiated by the carriers.

One development in indoors banking is to confine the currency and the tellers in one area and the customers in another area, walled off from the first, so that there is no face to face contact between the two. The areas are then interconnected by some sort of communicating system transferring currency and papers between the two. This allows one teller to handle several customers at a time as well as provides additional security. Similar systems may be used for "personal bankers", those who sit at individual desks and handle more than routine transactions. Each may have a "customer" terminal at his desk so that cash or other valuables, instead of kept at his desk, remain in the "back room", as it were, until needed.

But use of the typical out-of-doors pneumatic system indoors is defeated by the large radiused tube bends required for the former which make the same prohibitedly costly and awkward in terms of installation space indoors. For practical reasons therefore it is necessary that pneumatic carriers for indoors banking be able to turn, as it were, "square corners". And that in turn requires some kind of transfer arrangement so that the carrier in a typical installation can move both vertically within each terminal and then immediately horizontally through a transit tube beneath the floor which joins the terminal bases at a right or similarly abrupt angle. So far as known, the most pertinent pneumatic systems of this nature are those in U.S. Pat. Nos. 3,419,229; 3,761,039; and 4,084,769. The first of these employs a blower at each end of the transit tube between the terminals and relies wholly upon an opening to the atmosphere at the upper end of the receiving terminal to create a vertical draft, owing to the escaping confluence of the blowers from the transit tube, which both halts the carrier at the receiving terminal and then elevates it in that terminal. This scheme is probably rather uncertain in operation and likely needs some added assistance to halt the carrier in alignment with the receiving terminal and then to elevate it initially (see, for example, U.S. Pat. Nos. 3,512,735 and 3,556,437 to these ends). The other two patents, 3,761,039 and 4,084,769, incorporate elevators which transport the carrier vertically in each terminal before and after its passage through the horizontal transit tube. These latter two arrangements, though assuring location of the carrier with respect to the terminals, tend to lack sufficient lifting ability owing to their use of a single blower and its relatively remote location. This is certainly the case when the carrier is heavily laden unless an out-sized and thus costly blower is used. Hence the chief object of the present invention is an indoors pneumatic system for banking and the like which avoids the foregoing deficiencies and vagaries of the prior art systems as well as incorporates additional novel features which enhance its operation.

SUMMARY OF THE INVENTION

The invention, broadly speaking, employs a pair of vertical terminals interconnected at their lower ends by a carrier transit tube. Each terminal includes a carrier elevator and a blower, all arranged so that when the carrier is dispatched from the sending terminal, its elevator and the carrier first descend by gravity. The carrier is then propelled from the elevator through the transit tube and onto the elevator of the receiving terminal, all by the blower at the sending terminal. The blower at the receiving terminal thence initially lifts the elevator and carrier at the latter terminal until the effort of that blower is joined with that of the blower of the sending terminal through the transit tube, whereupon the carrier and elevator are lifted to the upper end of the receiving terminal. This cooperation between the two blowers is achieved by a special duct arrangement at each terminal and a number of controls which govern the operation not only of the two blowers to move the carrier and the elevators in the manner just described, but also the operation of a pair of vents atop the terminals which influence the speed of the carrier through the transit tube and the movement of the elevators in the terminals.

The carrier itself is preferably but not necessarily of the "captive" type, which is to say that it cannot be removed from either terminal. It is given a sliding cover which opens and closes with a sliding door atop each terminal so that items can be inserted in and removed from the carrier. The door of the sending terminal (and thus the carrier cover) is also integrated into the controls so that closing of that door unleashes the sequence of operations sensing the carrier to the receiving terminal. Other features and advantages of the present invention will become apparent from the drawings and the more detailed description which follows.

DETAILED DESCRIPTION OF THE PREFERRED EMBODIMENT

Figure 1:
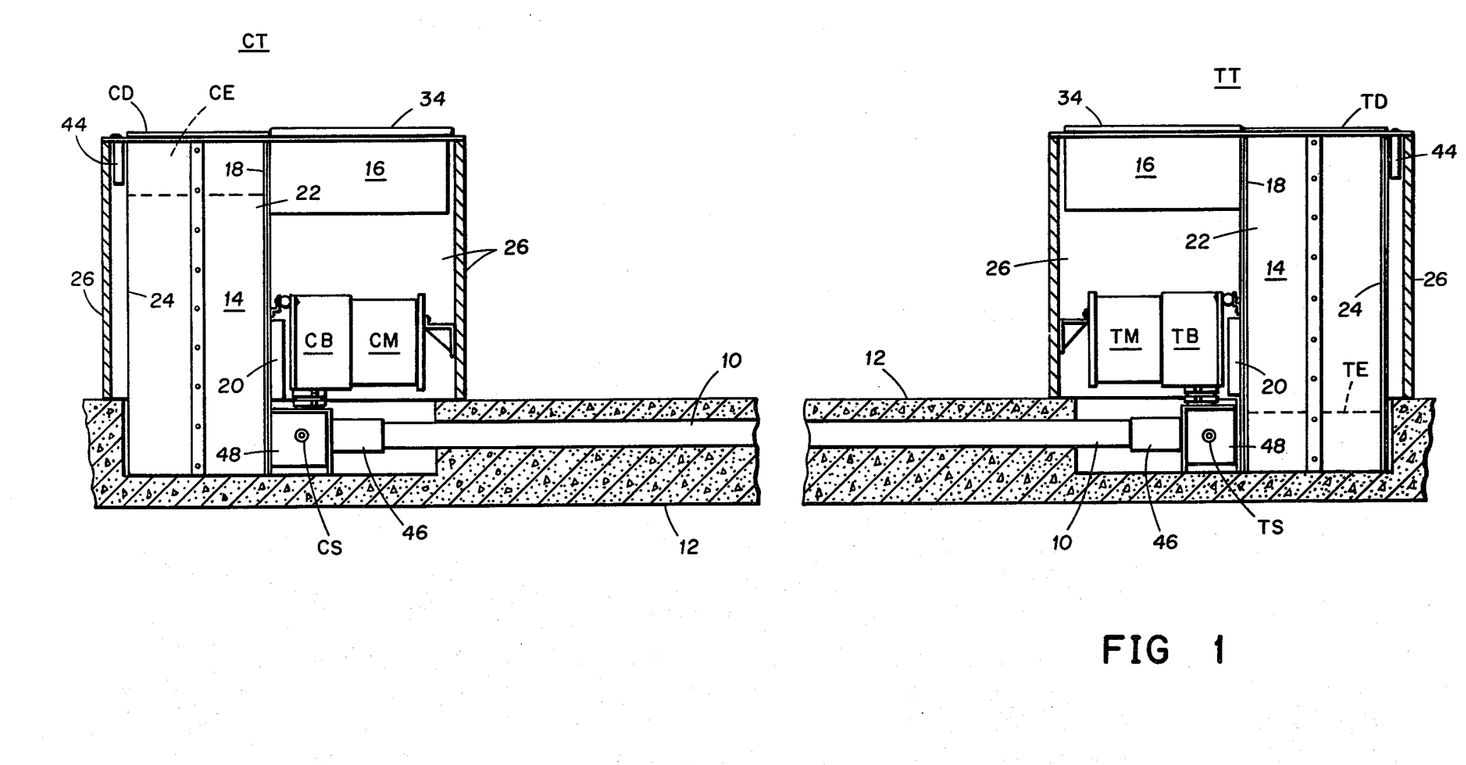
FIG. 1 is a somewhat diagramatic side elevation of a pair of interconnected customer and teller terminals according to the invention, certain parts being shown in section.

In FIG. 1 a customer terminal CT is depicted connected to a teller terminal TT by a carrier transit tube 10 extending horizontally beneath a floor 12. The terminals CT and TT are essentially identical in structure and operation so that only the teller terminal TT is shown in detail and identical reference numerals are used for both terminals except that certain parts will be given the prefix "C" or "T" in order to associate them with the terminal CT or TT, as the case may be.

Figure 2:
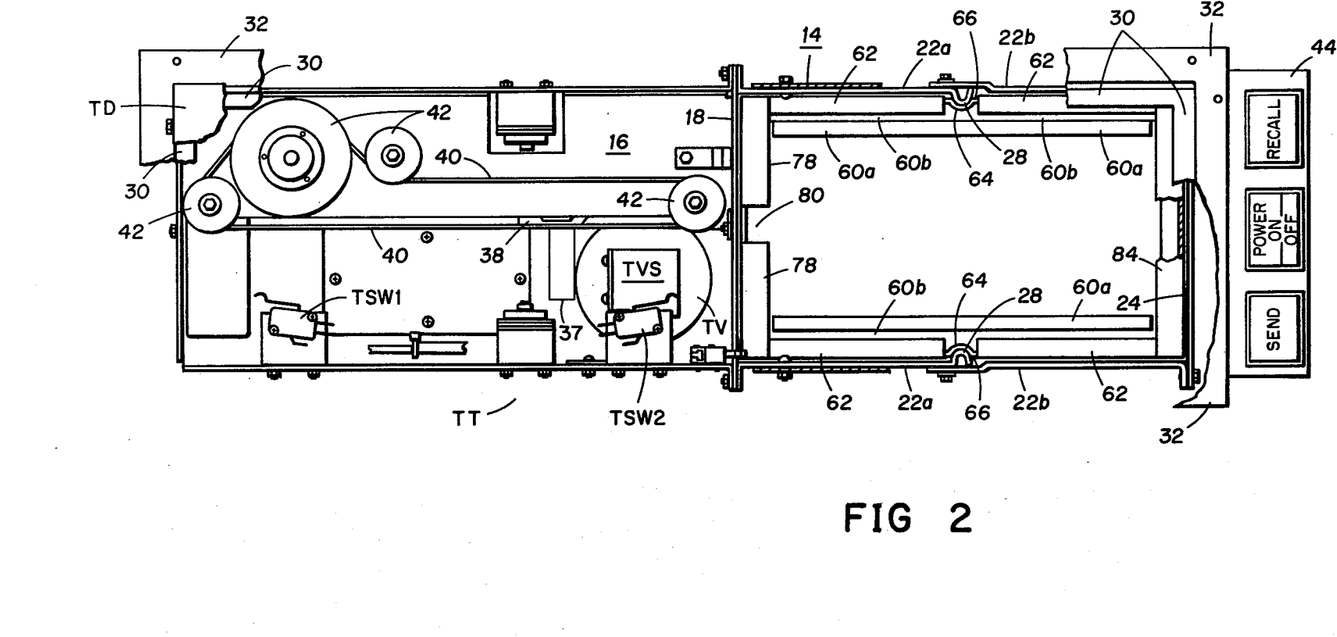
FIG. 2 is a top plan view of the teller terminal of FIG. 1, various parts being broken away to illustrate the interior of the terminal at its upper end.

The terminals CT and TT consist essentially of upright sheetmetal elevator enclosures 14, rectangular in cross-section, their lower ends being received into the floor 12 and their upper ends having a cantilevered pair of sheetmetal component enclosures 16. The respective ends of the two enclosures 16 are mounted on the opposing end walls 18 of the terminals CT and TT and open into the enclosures 14 through suitable apertures (not shown) in the end walls 18, the tops of the enclosures 14 and 16 being flush with each other. On the end walls 18 below the enclosures 16 are mounted a pair of electrical boxes 20 and a pair of integral motor-blower units, CM, CB and TM, TB, which are simply proprietary vacuum cleaner units and thus relatively small and inexpensive. Two pairs of side walls 22 and another pair of end walls 24, all bolted together and to the end walls 18, as shown in FIG. 2, complete the basic structure of the terminals CT and TT. The bottom walls of the enclosures 16 are apertured and normally closed by circular, elastomeric air valves CV and TV, the latter being opened by solenoids CVS and TVS (only valve TV and solenoid TVS being shown; see FIG. 2) in order to selectively vent the interiors of the enclosures 14 and 16 to the atmosphere. Each pair of enclosures 14 and 16 is then surrounded by an outer housing 26.

Figure 3:
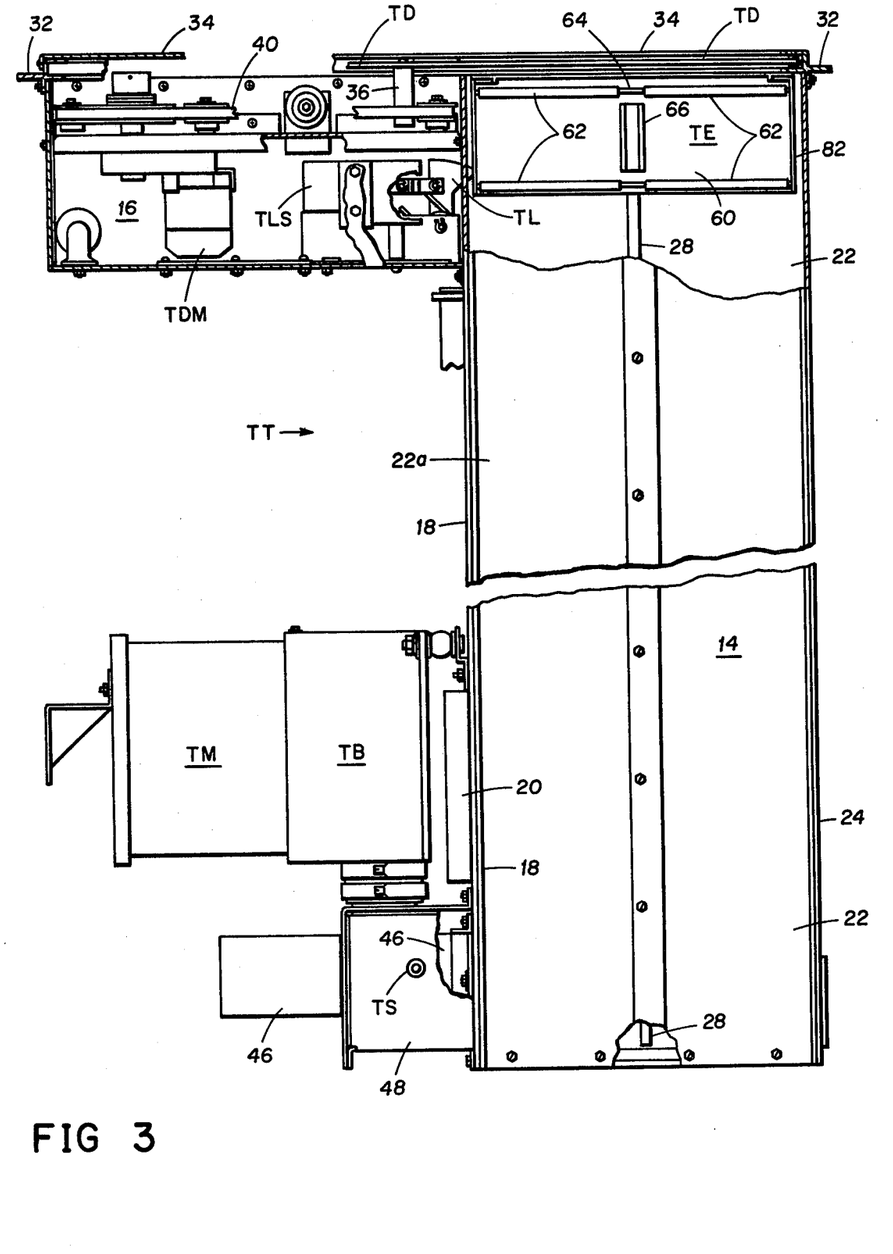
FIG. 3 is a side elevation of the teller terminal of FIG. 2, certain parts being broken away to further illustrate the interior of the terminal at its upper end.

It will be observed from FIGS. 2 and 3 that the side walls 22 of each terminal CT and TT are formed of two panels 22a and 22b laterally joined by bolts, the bolted edges of the former panels being formed with two vertical interior ribs to provide elevator guides 28. Inward flanges 30 frame the inner faces of the tops of the enclosures 14 and 16 to form door guides for the customer and teller terminal doors CD and TD. The latter doors are flanged sheetmetal panels which embrace the outer faces of the side walls 22 and slide back over the enclosures 16 to reveal the interiors of the enclosures 14. The flanges 30 in turn are spacedly framed by outward flanges 32 bolted to the outer faces of the tops of the enclosures 14 and 16. The flanges 32 mount fixed cover plates 34 (see FIGS. 1 and 3) which both cover the enclosures 16 and overlappingly frame the doors CD and TD. The latter doors are opened and closed by depending, transverse blocks 36, each having a lateral arm 37 for purposes to be described, attached at their upper ends to the under faces of the doors CD and TD and at their lower ends at 38 to drive belts 40 trained over sheaves 42 and driven by reversible door motors CDM and TDM, all disposed in the enclosures 16. The ends of the flanges 32 at the enclosure end walls 24 support control boxes 44, that of the teller terminal TT mounting three push button switches labeled "Send", "Power On/Off" and "Recall", while that at the customer terminal CT mounts a single push button switch labeled "Send".

The ends of the transit tube 10, which is rectangular in cross-section, are spigotted into sleeves 46 bolted to and opening into the lower ends of the terminals CT and TT through their end walls 18. The walls of the sleeves 46 are spacedly surrounded by manifolds 48 whose outer ends 50 are secured airtight about the sleeves 46, their inner ends being also bolted airtight to the terminal end walls 18 about the inner ends of the sleeves 46. The manifolds 48 open into the bottoms of the terminals CT and TT through wide but shallow ports 52 through the terminal end walls 18 below the sleeves 46 (see FIG. 4). The top walls of the manifolds 48 are apertured to receive the output of the blowers CB and TB through appropriate flexible connections 54. The side walls of the manifolds 48 are provided with sensors CS and TS, in the form of electric "eyes", which pass through the manifolds 48 and open into the transit tube 10 for purposes to be described.

Figure 4:
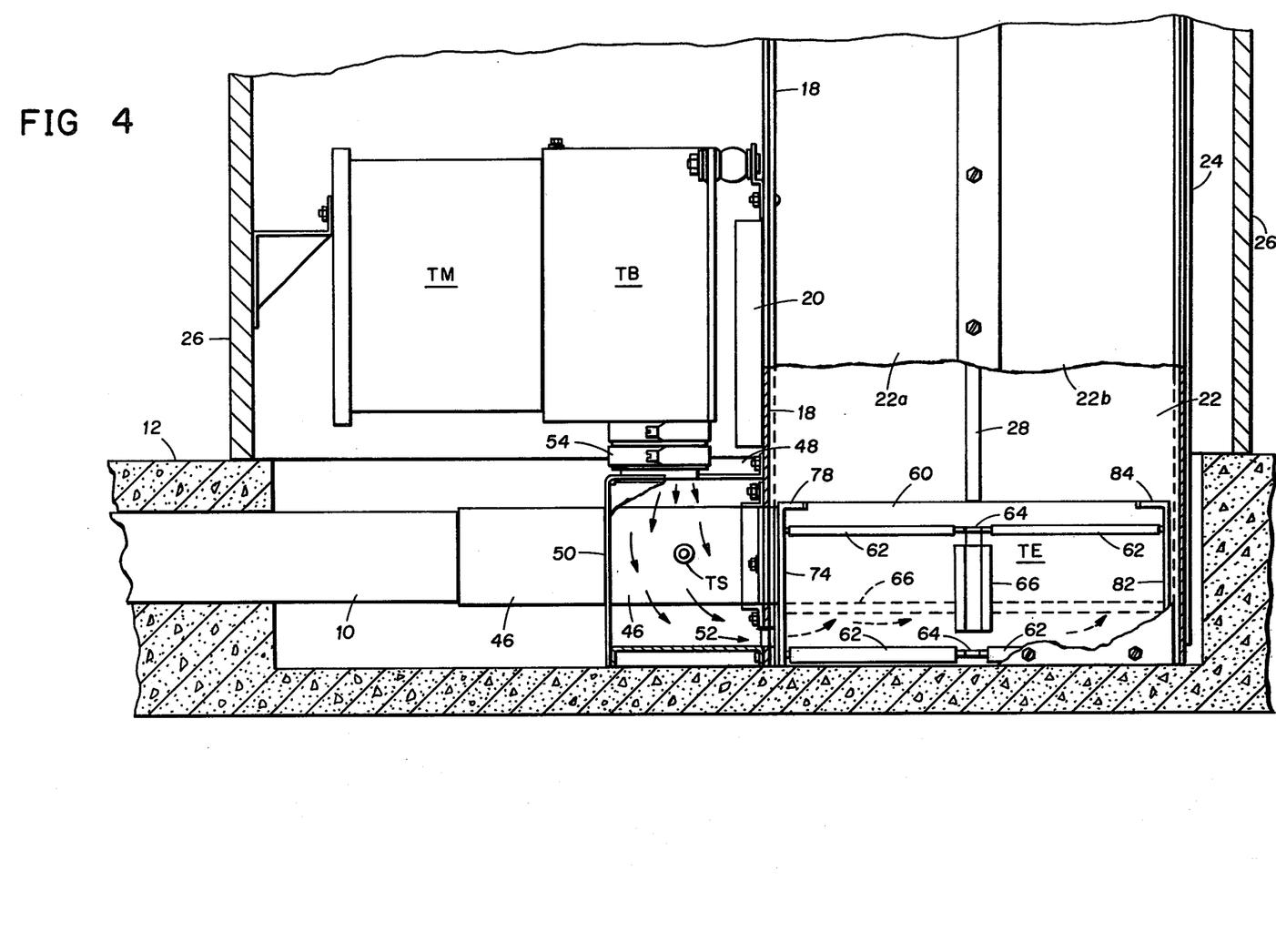
FIG. 4 is a side elevation of the lower portion only of the terminal of FIGS. 2 and 3, certain parts being broken away and sectioned to illustrate the details of the special ducting and the action of the blower at that terminal.
Figure 5:
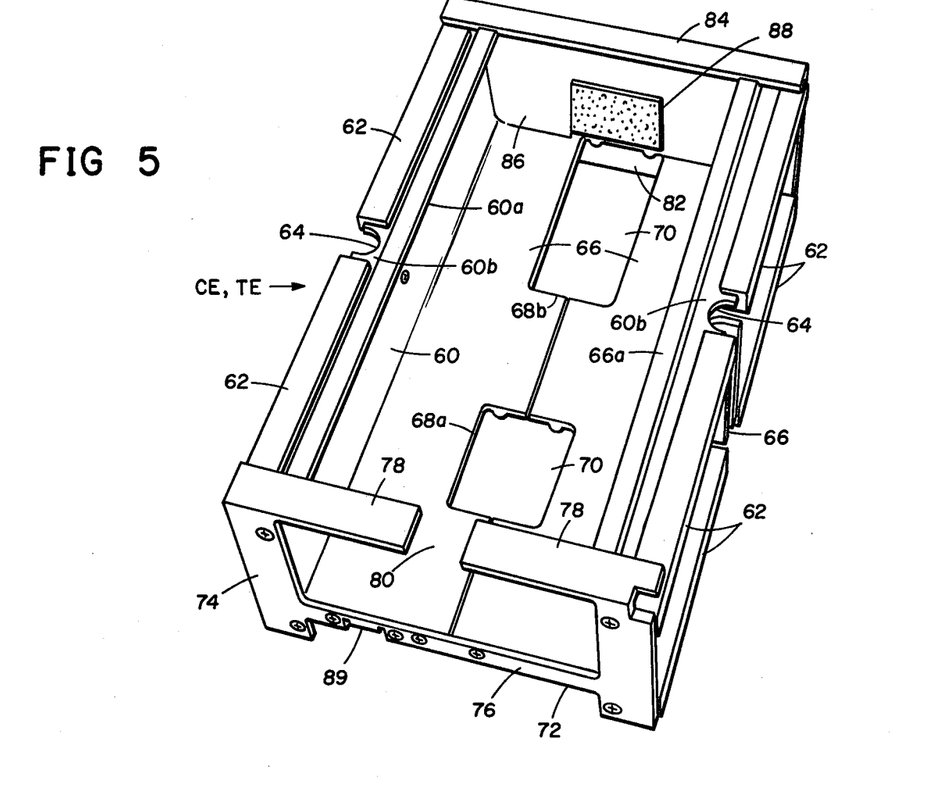
FIG. 5 is an upper perspective view of one of the carrier elevators employed in the terminals of FIGS. 1-4.

The carrier elevators CE and TE (see FIG. 5), one for each terminal CT and TT, comprise rectangular assemblies of extruded and fabricated aluminum which slidingly closely fit within the housings 14. Each elevator CE and TE includes a pair of side walls 60 inwardly flanged at their upper edges to provide carrier retainers 60a and outwardly flanged at 60b adjacent their upper and lower edges to receive strips of suitable sealing material 62 for engaging the inner faces of the terminal side walls 22. The flanges 60b and strips 62 are centrally interrupted at 64 to accommodate the elevator guides 28 on the terminal side walls 22, the guides 28 also engaging vertical runners 66 on the elevator side walls 60 between the flanges 60b. The floor 66 of each elevator CE and TE is composed of two abutting inner flanges integral with their respective side walls 60 and is ported at 68a and 68b for purposes to be described. The floor 66 is elevated so as to provide a wide shallow tunnel or passageway 70 with the side walls 60 below the floor 66 and the bottoms of the terminals CT and TT. The elevator passageways 70 are generally congruent with the ports 52 in the terminal end walls 18 and open through appropriate reliefs 72 in the elevator front end walls 74 screwed to the elevator end walls 60. The front end walls 74 are apertured above the floor 66 to provide carrier entrances 76, the upper edges of the end walls 74 having inward carrier retaining flanges 78 centrally interrupted at 80 for purposes to be described. The elevator rear end walls 82, having inward top flanges 84, are also screwed to the side walls 60 and form the rear ends of the floor ports 68b. The inner faces of the elevator end walls 82 are covered with thick carrier cushions 86 and the latter are centrally relieved at 88 to communicate with the passageways 70 therebelow through the floor ports 68b, the area of the reliefs 88 being substantially less than that of the carrier entrances 76, also for purposes to be described. When at their lower positions in the terminals CT and TT the elevators CE and TE merely sit upon the bottoms of the enclosures 14, as shown in FIG. 4. When, on the other hand, the elevators CE and TE are at their upper positions in the tops of the enclosures 14, as shown in FIGS. 2 and 3, they are retained by overrunning catches CL and TL which engage the under sides of the elevator floors 66 through reliefs 89 in the elevator front walls 74. The catches CL and TL are released by solenoids CS and TS, the latter and the catches CL and TL being located in the adjacent ends of the enclosures 16 and operating through appropriate apertures in the terminal end walls 18 (see FIG. 3).

Figure 6:
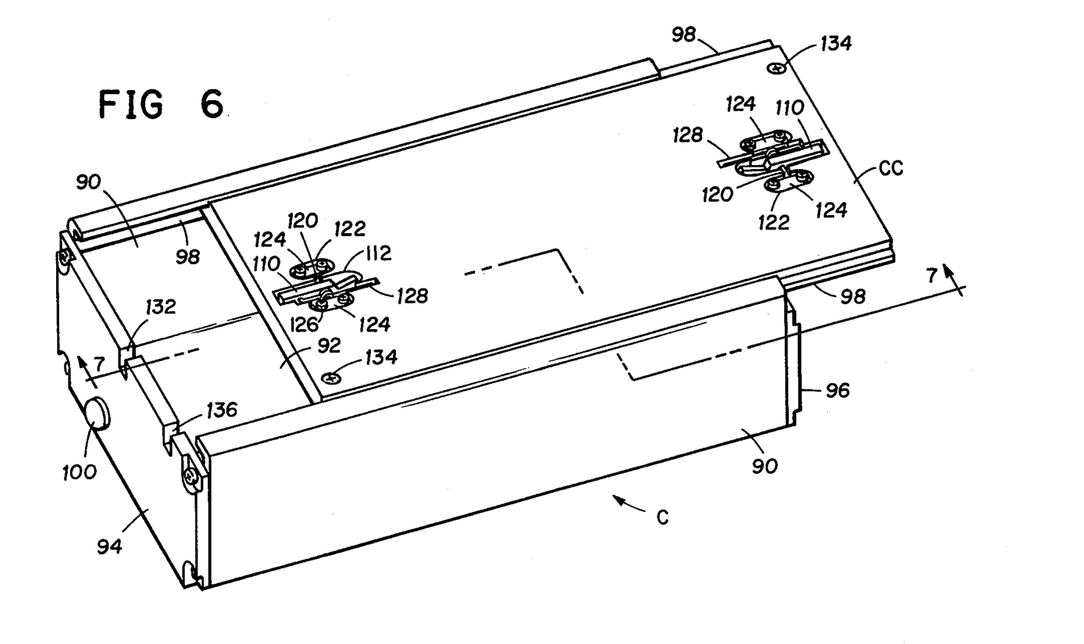
FIG. 6 is an upper perspective view of the carrier itself which is transmitted between the terminals of FIGS. 1-4.
Figure 7:
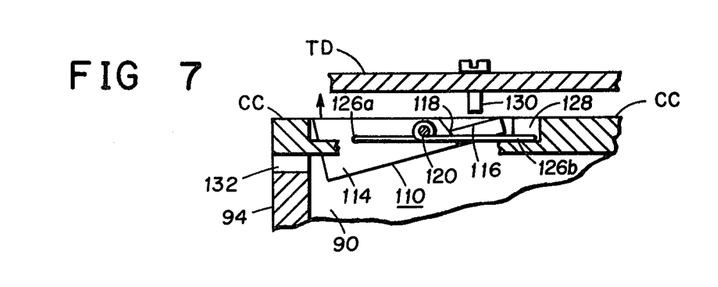
FIG. 7 is a partial sectional view taken along the line 7—7 of FIG. 6 but with the carrier cover closed and additionally illustrating the teller terminal door and its action upon the carrier cover.

The elevators CE and TE sequentially receive the single captive carrier C which is essentially a rectangular box cross-sectionally congruent with the transit tube 10. The carrier C comprises fabricated side walls 90, a bottom wall 92 and end walls 94 and 96, all secured by screws. The side walls 90 extend above the end walls 94 and 96 and they and a carrier cover CC are given tongue and groove configurations 98 so that the cover CC may be slid in either direction over the end wall 94 or 96 for access to the carrier's interior. The exterior of each end wall 94 and 96 is provided with a laterally offset bumper 100. As previously mentioned the cover CC is opened and closed by the terminal doors CD and TD. For this purpose the opposite ends of the cover CC are provided with oppositely disposed, longitudinally aligned latches 110 (see FIGS. 6 and 7). Each latch 110 is carried in a slotted aperture 112 in the cover CC and consists of a deep toe 114 and a shallower heel 116, the latter joining the toe 14 to form an upper shoulder 118. A pair of short transverse trunnions 120 extend from the sides of the latch 110 between the toe and heel 114 and 116. The ends of the trunnions 120 lie in shallow recesses 122 along the sides of the slot 112 and are pivotally secured by pillow blocks 124. A bias spring 126 is wound around one of the trunnions 120, one end 126a of the spring 126 being secured to the outer end of the toe 114 and the other end 126b lying in a narrow recess 128 in the cover CC along side the adjacent trunnion recess 122 such that the latch 110 is biased to the position shown in FIG. 7. In that position the toes 114 of the two latches closely abut the inner faces of the carrier end walls 94 and 96 and thus prevent the cover CC from being slid open in either direction. Each of the terminal doors CD and TD is then provided with a pair of depending latch operating pins 130 laterally aligned with the latches 110.

When, say, the teller elevator TE with the carrier C approaches its upper position in the teller terminal TT, the carrier door CC is closed. The teller door pins 130 thereupon engage and depress the two latch heels 116, rocking the latches 110 about their trunnions 120 against the springs 126, and thus raising the two latch toes 114 clear of their respective adjacent carrier end walls 94 and 96. The latch toes 114 are thereby raised and when the teller door motor TDM is energized, the door pin 130 adjacent the carrier end wall 94 moves (to the left in FIG. 7) and engages the shoulder 118 of the adjacent latch 110. As the door TD continues to open, that door pin 130 therefore begins to slide open the carrier cover CC. As the latter opens, the depressed heel 116 of the adjacent latch 110 clears the carrier end wall 94 by virtue of one of a pair of slots 132 in the upper edges of the door end walls 94 and 96 for that purpose and then the carrier retaining flanges 78 through their interruption 80. When the door TD and cover CC are fully open, the arm 37 of the block 36 on the door drive belt 40 contacts the latter one of a pair of micro-switches CSW1 and TSW1 in the enclosures 16 of the terminals CT and TT (see FIG. 2) and halts the door motor TDM. When the latter is again energized to reclose the door TD and cover CC, the opposite door pin 130 engages the shoulder 118 of the opposite latch 110 to close the cover CC with the door TD until the door motor TDM is again deenergized by the arm 37 of the drive belt block 36 engaging the latter one of a second pair of micro-switches CSW2 and TSW2 in the enclosures 16 of the terminals CT and TT (see FIG. 2). As the elevator TE and carrier C thereafter descend in the terminal TT, the cover latches 110 are released from the door pins 130 and return to the position shown in FIG. 7, thus latching the cover CC against movement in either direction. It will be understood that the operation of the latches 110 by the customer door CD when the carrier C is in the customer elevator CE at its upper position is identical except in reverse order to that described, the micro-switches CSW1 and CSW2 then energizing and deenergizing the customer door motor CDM. In order to prevent the cover CC from being accidentally pushed so far in one direction or the other relative to the terminal door CD or TD that the door pins 130 are disengaged from the latches 110, the cover CC is provided with a pair of depending stops pins 134 at diagonally opposite corners (see FIG. 6) one of which engages the inner face of its opposite carrier end wall 94 or 96, as the case may be, while the other clears its adjacent carrier end wall 94 or 96 through appropriate notches 136.

Overall operation of the system is as follows: Assume that the customer elevator CE with the carrier C therein is in its upper position as indicated in FIG. 1, being held there by the latch CL, and the terminal door CD and thus the carrier cover CC are open. A customer approaches, deposits his transaction in the open carrier C and pushes the "Send" button at the terminal CT. The door motor CDM is thereupon activated in one direction, whereby the carrier cover CC and the door CD are jointly closed in the manner previously described. When the latter are closed, the door motor CDM is deenergized by the switch CSW2 and the latch solenoid CLS is energized, releasing the latch CL. At the same time the air valve solenoid TVS is energized, opening the air valve TV at the teller terminal TT, and the blower motor CM is also energized. The elevator CE and the carrier C thereupon descend by gravity to their lower position in the terminal CT, the carrier cover CC now being latched closed as previously described and the air ahead of the elevator CE being exhausted through the transit tube 10, the terminal TT and the air valve TV. By the time the elevator CE has reached its lower position, the blower CB is up to speed and air therefrom is discharged through its manifold 48 and the port 52 into the passageway 70 beneath the floor 66 of the elevator CE, thence through the floor port 68b and the relief 88 in the rear wall cushion 86 of the elevator CE, and finally against the adjacent end wall 94 (or 96) of the carrier C. Since the door CD and the air valve CV are closed at this time, so that the terminal CT is thereby closed to the atmosphere, the effect of the air is to propel the carrier C from the elevator CE into the transit tube 10, the remainder of the port 68b and the port 68a in the elevator floor 66 increasing the flow of air behind the carrier C from the passageway 70 as the former leaves the elevator CE. When the carrier C passes the sensor CS, the air vent solenoid TVS is deactivated, closing the teller terminal air vent TV, the air ahead of the carrier C in the transit tube 10 thereafter bleeding out through the elevator TE, port 52, manifold 48 and the inactive blower TB at the teller terminal TT. Closing the air vent TV at this time helps control the speed of the carrier C so that, especially when it is heavily loaded, it does not arrive at the terminal TT with too great a velocity and badly jar both its contents and the terminal TT.

When the carrier C passes the sensor TS at the latter terminal, the teller blower motor TM is activated and the teller air valve TV is reopened by the solenoid TVS, opening in turn the interior of the terminal TT above the elevator TE to the atmosphere. The carrier C immediately thereafter arrives onto the teller terminal elevator TE through its entrance 76. The blower TB exhausts through the manifold 48 and port 52 into the passageway 70 of the teller terminal TT, the air acting upon the teller elevator floor 66 and the bottom wall 92 of the carrier C through the floor ports 68a and 68b of the elevator TE. Since the blower CB is still operating, its pressure through the transit tube 10 acting upon the carrier end wall 94 (or 96) prevents the carrier C from being dislodged from the elevator TE by air from the blower TB acting upon the carrier C through the relief 88 in the teller elevator cushion 86 since that relief 88, as previously noted, is of substantially less area than that of the entrance 76 of the teller elevator TE. The air from the blower TB therefore initially lifts the elevator TE and carrier C up the terminal TT until, as the adjacent mouth of the transit tube 10 is uncovered, the air from the blower CB joins in and the air from both blowers CB and TB together raise the elevator TE and carrier C to their upper position in the terminal TT, whereupon they are retained by the latch TL. The movement of the latch TL as it is overrun by the elevator TE thereupon turns off both blower motors CM and TM and recloses the teller air valve TV. Simultaneously a time delay circuit, of about two seconds duration, is activated and upon expiration activates in turn the terminal door motor TDM to open the teller door TD and thus the carrier cover CC in the manner previously described, the switch TSW1 thereafter deactivating the door motor TDM. The reason for the delay in the opening of the teller door TD is to give the blower TB time to wind down so that when the teller door TD is opened a blast of air is not forthcoming. The entire system is then "at rest." When the teller has completed the transaction he pushes his "Send" button, the entire sequence is repeated in the reverse order to that just described until the elevator CE and carrier C are once again at their upper position in the customer terminal CT and the door CD of the latter and the carrier cover CC are open to the customer. Should the teller wish to recall the carrier C from the terminal CT, he pushes the "Recall" button which then has the same affect as if a customer had pushed the "Send" button at the terminal CT.

The actual electrical circuitry by which the foregoing "logic" or sequences of operation are accomplished is quite conventional and fully within the competence of those ordinarily skilled in the art to provide. Because of this and because that circuitry is not part of the invention it need not be further described. Various modifications of the system as set forth will also be apparent to those skilled in the art so that, though the invention has been described in terms of a particular embodiment, being the best mode known of carrying out the invention, it is not limited to that embodiment alone. Instead, the following claims are to be read as encompassing all adaptations and modifications of the invention falling within its spirit and scope. Furthermore, when reading those claims it should be noted that the terms "leading" and "trailing" therein, when applied to the elevators CE and TE, refer to their respective ends 74 and 82, and, when applied to the carrier C, refer to its end walls 94 or 96 depending upon in which direction the carrier C is being transmitted between the terminals CT and TT.

I claim:

1. In a pneumatic communication system having a pair of spaced apart first and second carrier terminals, each of the terminals defining an upright enclosure having upper and lower ends; a carrier transit tube interconnecting and opening into each terminal adjacent its lower end; first and second carrier elevators respectively in the first and second terminals and movable therein between upper positions adjacent the terminal upper ends and lower positions adjacent the terminal lower ends; a carrier for containing items to be transported back and forth between the terminals through the transit tube, each carrier elevator and the carrier having corresponding leading and trailing transverse ends with respect to each terminal and the respective directions of travel of the carrier through the transit tube, the carrier being receivable on each carrier elevator from the transit tube through an opening in the leading end of the carrier elevator when in its lower position and movable through the transit tube by pneumatic pressure upon the carrier trailing end, each carrier elevator with the carrier thereon being gravitationally descendable from its upper to its lower position and elevatable from its lower to its upper position by pneumatic pressure; first and second selectively operable releasable means respectively retaining the first and second elevators with the carrier thereon in their upper positions and releasable to allow the same to descend to their lower positions; and first and second selectively operable pneumatic pressure producing means communicating with the atmosphere and respectively associated with the first and second terminals, the system being characterized by: the first releasable means operating to allow the first carrier elevator with the carrier thereon to descend to its lower position; the first pressure producing means only thereupon operating to pneumatically communicate with the trailing end of the carrier when on the first carrier elevator at its lower position and thence with the transit tube through the first carrier elevator and said opening therein effective to propel the carrier from the first elevator and through the transit tube onto the second carrier elevator through said opening therein when the second carrier elevator is at its lower position; the second pressure producing means then also operating to pneumatically communicate with the second carrier elevator effective to elevate the same and the carrier thereon in the second terminal so that the operating first pressure producing means thereupon also pneumatically communicating with the second carrier elevator via the transit tube and together with the operating second pressure producing means elevates the second carrier elevator and the carrier thereon to its upper position, the second releasable means thereupon operating to retain the second carrier elevator and the carrier thereon in its upper position; the second releasable means operating to allow the second carrier elevator with the carrier thereon to descend to its lower position; the second pressure producing means only thereupon operating to pneumatically communicate with the trailing end of the carrier when on the second carrier elevator at its lower position and thence with the transit tube through the second carrier elevator and said opening therein effective to propel the carrier from the second elevator and through the transit tube onto the first carrier elevator through said opening therein when the first carrier elevator is at its lower position; the first pressure producing means then also operating to pneumatically communicate with the first carrier elevator effective to elevate the same and the carrier thereon in the first terminal so that the operating second pressure producing means thereupon also pneumatically communicates with the first carrier elevator via the transit tube and together with the operating first pressure producing means elevates the first carrier elevator and the carrier thereon to its upper position, the first releasable means thereupon operating to retain the first carrier elevator and the carrier thereon in its upper position; first and second vent means respectively associated with the first and second terminals and operable to vent the system ahead of the carrier to the atmosphere, each of the vent means having successive first, second and third stages of operation, the first stage of the second vent means operating while the first carrier elevator with the carrier thereon descends from its upper to its lower position upon release of the first releasable means, the second stage of the second vent means operating while the carrier is moving through the transit tube from the first to the second terminal, the third stage of the second vent means operating while the second carrier elevator with the carrier thereon is being elevated to its upper position, the first state of the first vent means operating while the second carrier elevator with the carrier thereon descends from its upper to its lower position upon release of the second releasable means, the second stage of the first vent means operating while the carrier is moving through the transit tube from the second to the first terminal, the third stage of the first vent means operating while the first carrier elevator with the carrier thereon is being elevated to its upper position, the second stages of operation of the first and second vent means being effective to control the speed of the carrier through the transit tube; and means controlling operation of the first and second pressure producing means, the first and second vent means, and the first and second releasable means, all as aforesaid.

2. The system of claim 1 further characterized by: the first vent means comprising a first upper vent disposed adjacent the upper end of the first terminal and a first lower vent disposed at the transit tube ahead of but adjacent its entrance into the first terminal, successive operations of the first upper vent constituting the first and third stages of the first vent means and operation of the first lower vent consituting the second stage of the first vent means; the second vent means comprising a second upper vent disposed adjacent the upper end of the second terminal and a second lower vent disposed at the transit tube ahead of but adjacent its entrance into the second terminal, successive operations of the second upper vent constituting the first and second stages of the second vent means and operation of the second lower vent constituting the second stage of the second vent means.

3. The system of claim 2 further characterized by: the first and second upper vents of the first and second vent means each comprising a normally closed air valve, and the first and second pneumatic pressure producing means comprising first and second blowers respectively mounted to the exteriors of the first and second terminals, the first and second blowers when inoperative providing communication between the atmosphere and the transit tube and respectively constituting the first and second lower vents of the first and second vent means.

4. The system of claim 3 further characterized by: the output of each blower pneumatically communicating beneath its respective carrier elevator by means of a manifold and a passageway, the manifold being disposed exteriorly of its respective terminal and spacedly enveloping the exterior of the adjacent end of the transit tube, one end of the passageway leading from the manifold to beneath said carrier elevator when in its lower position, the passageway being partially defined by a bottom wall of said carrier elevator constituting a floor for supporting the carrier thereon and a pair of spaced side walls depending from said floor, the other end of the passageway communicating as aforesaid with the trailing end of the carrier when on said floor.

5. The system of claim 4 further characterized by: each of the carrier elevators having an end wall at the trailing end thereof, said communication with the trailing end of the carrier when on said carrier elevator including an aperture in said end wall communicating with said other passageway end and having an area less than that of said opening in the leading end of said carrier elevator; and one or more apertures in the floor of said carrier elevator communicating with said passageway.

6. The system of claim 5 further characterized by: the control means including first and second sensing means disposed on the transit tube adjacent the respective ends thereof and responsive to passage of the carrier thereby, the first sensing means closing the second upper vent means during passage of the carrier in the transit tube from the first to the second terminal and the second sensing means closing the first upper vent means during passage of the carrier in the transit tube from the second to the first terminal, the first sensing means also initiating said operation of the first blower during passage of the carrier from the second to the first terminal and the second sensing means also initiating said operation of the second blower during passage of the carrier from the first to the second terminal.

7. The system of claim 6 further characterized by: the control means including first and second blower operating means, the first blower operating means initiating said operation of the first blower upon descent of the first carrier elevator with the carrier thereon to its lower position and terminating said operation of both blowers upon elevation of the first carrier elevator with the carrier thereon to its upper position, the second blower operation means initiating said operation of the second blower upon descent of the second carrier elevator with the carrier thereon to its lower position and terminating said operation of both blowers upon elevation of the second carrier elevator with the carrier thereon to its upper position.

8. The system of claim 1, 2, 3, 4, 5, 6 or 7 further characterized by: each carrier elevator having an open top and each terminal including a top wall having an opening therein; a door slidable to open and close said opening, the door when open exposing the carrier in the carrier elevator of the terminal when in its upper position; and power means to open and close the door, the control means also controlling operation of the power means.

9. The system of claim 8 further characterized by: the carrier including a cover slidable to open and close access to the interior of the carrier, the cover being operably associated with the door of each terminal when the carrier is in its upper position so that the cover is opened as the door is opened and closed when the door is closed.

* * * * *